Oct. 6, 1964  J. F. McHUGH  3,151,382
METHOD FOR MAKING MICA CONDENSERS
Filed Jan. 10, 1961
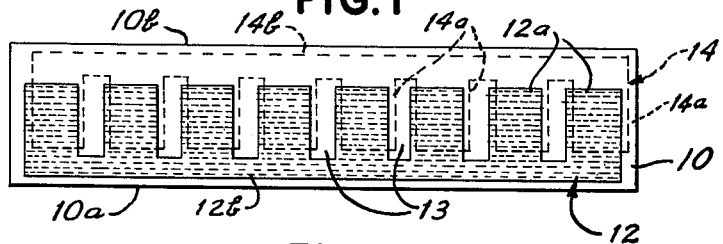
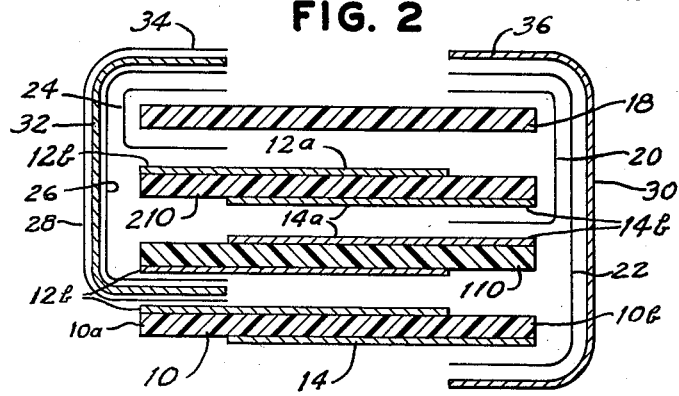
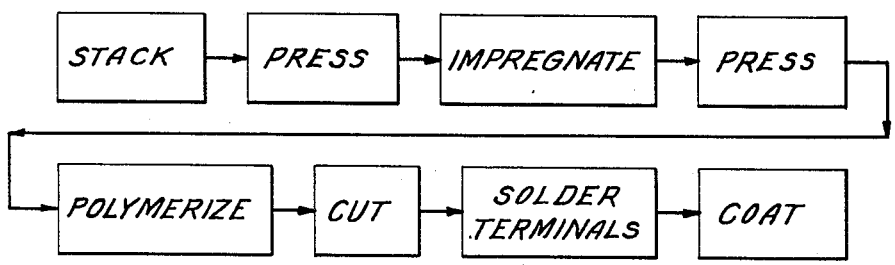
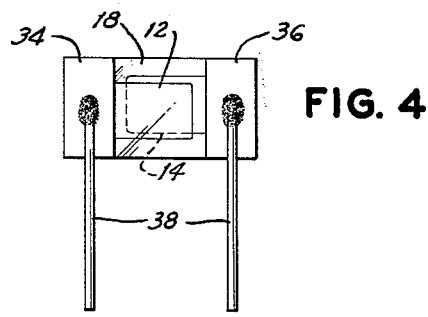
INVENTOR.
JAMES F. McHUGH
BY Paul S. Martin
ATTORNEY

United States Patent Office 3,151,382
Patented Oct. 6, 1964

3,151,382
METHOD FOR MAKING MICA CONDENSERS
James F. McHugh, Cranston, R.I., assignor to Cornell-Dubilier Electric Corporation, a corporation of Delaware
Filed Jan. 10, 1961, Ser. No. 81,891
9 Claims. (Cl. 29—25.42)

The present invention relates to methods of making mica condensers.

An object of this invention is to devise a novel method for producing compact mica condensers. Another object resides in a novel method of construction of small stacked mica condensers that are more economical to produce and more compact for a given electrical size than comparable prior art types of mica condensers having metal end clips. A collateral object of the invention resides in the provision of a novel method of making such condensers wherein electrode-bearing micas can be stacked and processed as multiple-condenser units, which can then be cut apart into individual units to which wire terminals can be soldered. An additional object of the invention resides in novel manufacturing methods for producing mica condensers, for expediting mass production and for facilitating manufacture of stacked mica condensers of extremely small mechanical size. A further object is to provide a novel method of producing impregnated stacked-mica condensers.

The various features of the invention may be practiced pursuant to the illustrative embodiment described in detail below. In that embodiment, electrodes of fired silver paint are formed as films on the opposite faces of strips of mica. A number of these micas are stacked, and lead-tin alloy foil is interposed between edge portions of confronting electrode areas of the micas, alternately at one edge and at the opposite edge of the successive micas in the stack. In addition, a pair of foils of a relatively hard higher-melting-point metal are provided along the edges of the stacked mica strips, including one such additional foil that is folded around all of the mica elements and another that is folded around all but one of the micas and is interposed between that one mica and the remainder of the stack. The stacked mica strips with the lead-tin foils and the relatively hard foils are then baked, to dispel surface moisture, and subjected to heavy flattening pressure below the melting point of the lead-tin foils. This forms cold pressure welds between the lead-tin foils and the film electrodes and it also unites the lead-tin foils and the hard-metal foils where they overlie one another. Cold pressure welding, commonly called cold welding, is the process of joining metals under conditions where no liquid phase is produced or introduced into the weld at any stage and without reliance on heat to produce fusion of the metals being joined. The pressed stack is impregnated, pressed again to expel excess impregnating liquid, and the impregnant is polymerized so that the stack of micas that is initially united mechanically by the cold welds becomes a bonded unit. The piece at this phase of the assembly is cut into tiny individual-condenser units to which wire terminals are secured by soldering. Subsequent application of a protective encapsulating coating completes each condenser.

The sequence of steps of cold-welding the film electrodes to the soft foils followed by impregnation and polymerization is of special importance. The initial step of cold-welding provides a series of electrical connections that are not impaired by the subsequent impregnation and provides a mechanical union between the micas, thus making impregnation of the stacked micas feasible. In turn, the impregnation and polymerization greatly facilitates and promotes successful cutting of the tiny stacked units, and it imparts important electrical properties to the finished unit.

The inclusion of foils of hard strong metal (in contrast to the lead foil that is sufficiently soft to form cold welds) is of considerable importance. If only lead-tin foils were used, it would be difficult to provide the condensers with soldered wire terminals. The foils would melt during soldering attempts, and are mechanically too weak to unite the terminal wires to the mica stacks. In an effort to avoid this, metal end clips might be used or conceivably the wires might be wrapped around the individual condenser stacked units. In either case the terminal structure becomes bulky, prominently bulky in the case of tiny units. The increase in bulk is due not only to the mass of metal that forms the terminal, but this bulk is considerably enlarged by the encapsulating coating subsequently applied. By contrast, the present terminal foils provide strong and solderable terminals without any appreciable increase in bulk of the stacked condenser unit beyond that involved in the micas and the connecting lead-tin foils.

The use of these hard terminal foils is also of importance in the manufacturing operation. These terminal foils are incorporated in the condenser units in the same operation as that which forms the stacked micas into a unit. Moreover this is done at a time when each mica stack represents a number of condenser units, the solderable metal foils being readily sheared in the same operation that cuts through the micas and the lead-tin foils. This procedure avoids handling of individual tiny metal terminals for assembly to individual stacked-mica condenser units, in a separate terminal-applying operation.

The nature of the invention, its various novel aspects and further objects will be more fully apparent from the following detailed description of an illustrative embodiment of the invention, which is shown in the accompanying drawings. In those drawings:

FIGURE 1 is an enlarged plan view of an individual mica having bonded metal-film electrodes;

FIGURE 2 is a greatly enlarged cross-section of stacked parts of a mica condenser, including three micas of the form in FIGURE 1.

FIGURE 3 is a flow diagram of the operations performed in the novel method of manufacturing a mica condenser of novel construction, and FIGURE 4 is an enlarged view of the novel condenser, as it appears just prior to the final encapsulation.

In FIGURE 1, a long and narrow strip 10 of mica is shown having a film 12 of fired-on silver paint on its top face and a like pattern of fired-on silver paint 14 on its opposite face. The metal films 12 and 14 include tongues 12a and 14a that confront each other in a series of areas there being eight such areas in this illustration. In practice the edges of tongues 12a and 14a are aligned, ideally, these tongues being shown off-set from each other for clearer illustration. Each film 12 and 14 has a marginal portion 12b and 14b which extends close to edges 10a and 10b, respectively. The lateral edges of the tongues are separated by gaps 13.

In an example, the micas may be only .001 or .002 inches thick, 0.25 inch wide and 1.25 inch long for micas having twelve (rather than eight) confronting tongues 12a and 14a.

In FIGURE 2 a series of these micas bearing metal films are shown stacked. For convenience, the bottom mica is designated 10, the next mica is designated 110 and the third is designated 210. A dummy mica 18 appears at the top, which does not have a film electrode.

A number of foils 20, 22, 24, 26 and 28 are shown for providing connection to areas 12b and 14b of micas 10, 110 and 210. In an example, these connecting foils are of 0.0006 inch lead-tin foil, and are relatively soft and malleable. A pair of terminal foils 30 and 32 are shown, these being of relatively hard, solderable metal. These terminal foils are of tinned copper approximately .001 inch thick in an example.

All of the foils are flat during the assembly operation, initially. The electrode-bearing micas, a dummy mica 18, and the foils are stacked with each foil extending between the edge portions of confronting micas alternating between opposite edges of the stack. The foils are then bent upright while the micas are moderately pressed together, and finally the foils are bent over the top of the stack of micas.

The edges of the micas are all in alignment in the stack, and the film electrodes are applied uniformly relative to the mica, and in this way assurance is had that the confronting areas 12a and 14a of the silver-film electrodes of successive micas overlie one another and that the spaces 13 between the confronting electrode areas are also in alignment in the stack.

The stacked strips of micas with their metal films and interposed foils folded as shown in FIGURE 2 are next baked to drive off surface moisture on silver-film electrodes 12 and 14, at a temperature below the melting-point of the lead-tin foil; and while thus heated, the stacks are subjected to intense pressure between flat opposed pressure members, as in a hydraulic press. This operation unites the stack as a mechanically tight unit. It is also effective to make excellent electrical connections from all the film electrodes to the terminal foils 30 and 32. The intense pressure is sufficient to form cold-welds between the metal films 12 and 14 and the respective opposed foils 20, 22, 24, 26 and 28; it cold-welds the terminal foils 30 and 32 to the confronting foils 22, 26 and 28 respectively at areas facing film electrodes 14 nad 12 respectively; it cold-welds foils 24, 26, 28 and 32 at a terminal region 34; and it cold-welds foils 20, 22 and 30 at another terminal region 36. Considering this operation, it would be possible to use a hard-metal foil 32 with an initially bonded thickness of suitably ductile metal replacing foils 26 and 28; and likewise foils 22 and 30 might alternatively be bonded before being assembled. However, it has been found advantageous to assemble and cold-weld the film electrodes and the various foils as shown without requiring preparation of special copper foils. An example of such special foil would be .001 inch copper foil bearing lead-tin bonded layers of .0006 inch thickness, to substitute for the separate foils of the illustrative dimensions given above.

The stacking and pressing operations described are the first two steps diagrammatically illustrated in FIGURE 3. The unit thus produced is next impregnated with an insulating liquid, polyvinylformalacetyl resin for example, by usual vacuum-impregnation techniques. The stacked micas, bonded by the foils, can be handled in bulk during this operation.

During the impregnating operation, the impregnant not only fills the voids between the micas, but the impregnant also coats the entire mica stack including the areas where terminal wires are later to be soldered. The impregnant should be one selected to be compatible with this soldering operation if scraping is to be avoided preparatory to the subsequent soldering operation. Polyvinylformalacetyl resin is one example of an impregnant that satisfies this soldering condition, but others are known that meet this requirement.

The impregnated units are then spread on a flat surface and pressed, large numbers of these units being pressed concurrently for expelling surplus impregnant. Moderate heating then effects polymerization, preferably controlled at this time to effect incomplete polymerization so that the polymer remains somewhat plastic. These strips are subdivided into separate units, shearing them transversely at each of the spaces 13 (FIG. 1). While these individual units may be extremely small (one-quarter inch by one-eighth inch in an example) the laminations remain firmly adhered to each other and the various electrical connections described remain undisturbed. Due to the pressing operation that precedes the impregnation, the electrical connections previously described are also preserved.

In FIG. 2 the united foil portions 34 and 36 which overlie dummy mica 18 are normally covered by a film of the polymerized impregnant following the cutting operation. Nevertheless, wire leads 38 can readily be soldered to terminal portions 34 and 36 in the next operation without scraping the coating of impregnant from the soldering areas. Finally, a suitable encapsulating coating such as an epoxy resin is applied to complete the unit.

The completed condenser (omitting the encapsulating covering) is shown in FIGURE 4. In this greatly enlarged view, it is apparent that the edges of electrodes 12 and 14 are separated by a limited length of surface path around the lateral edges of each mica. The impregnation greatly enhances the voltage breakdown characteristics of this region; and the impregnation is carried out in a manner that does not disturb the vital electrical connections to the film electrodes. The stacked-mica impregnated units are seen to have mechanically and electrically strong terminals for soldering to wires 38, yet such terminals are included without any extra fabricating operation, without a separate operation of handling and mounting tiny metal end clips, and without any significant increase in bulk of the completed unit as compared to such a unit lacking solderable foil terminals.

The foregoing detailed description includes a number of novel features and represents the presently preferred embodiment of the various aspects of the invention. This description will naturally prompt those skilled in the art to make varied applications, substitutions and modifications of those novel features, and the invention should be broadly construed, in accordance with its full spirit and scope.

Having thus described my invention what I claim as new and desire to secure by Letters Patent is:

1. The method of making mica condensers, including the steps of providing the opposite faces of elongated strips of mica with rows of bonded metal-film electrodes, the electrodes of each strip being opposed and spaced apart and the spaces between the electrodes on opposite faces being mutually aligned, stacking said strips of mica with intervening soft metal foils between electrodes of successive mica strips at opposite edges of the strips and alternating from side to side of the stack from each mica strip to the next, including a relatively hard solderable foil in the stack and bending all of the foils across corresponding edges of the stack and around respective end portions of the stack, welding said soft metal foils to said electrodes and to said terminal foils and thereby uniting said stack of strips, impregnating the united stack with an insulating polymer and polymerizing the impregnant, cutting across said united stack at the spaces between said electrodes and thereby producing a number of condenser units each having respective hard-metal terminals connected to film electrodes of a united stack of micas.

2. The method of making mica condensers, including the steps of stacking a number of micas each having bonded metal-film electrodes on the opposite faces thereof with lead-tin foils interposed between edge portions of confronting electrodes of successive micas in the stack alternately at one edge and at the opposite edge of the stack and with a pair of relatively hard solderable terminal foils at opposite edges of the stack, cold-welding the lead-tin foils to said confronting electrodes and to said terminal foils and thereby uniting said micas mechanically and forming electrical connections from said metal-film electrodes to said terminal foils, impregnating the thus united stack with a dielectric polymer, polymerizing the impregnant and soldering respective wire terminals to said terminal foils.

3. The method in accordance with claim 2, wherein said dielectric polymer is polyvinylformalacetate resin and wherein the wire terminals are applied directly to areas of said terminal foils that are impregnant-coated at the start of said soldering step.

4. The method of making mica condensers, including the steps of providing the opposite faces of elongated mica strips with rows of bonded metal-film electrodes, the electrodes of each strip being spaced apart along each face and the spaces between the electrodes on opposite faces being mutually aligned, stacking said strips with soft metal foil interposed between alternate electrode-bearing edge portions of the successive micas in the stack, cold-welding the respective foils to confronting metal-film electrodes of successive mica strips in the stack and thereby uniting the micas into a unitary stack and forming electrical connections to the metal-film electrodes, thereafter impregnating the united mica strips with an unpolymerized resin and polymerizing the resin, and cutting the resulting device at said spaces into a series of separate condenser units.

5. The method of making mica condensers, including the steps of providing micas with metal-film electrodes at the opposite faces thereof, stacking such micas with relatively soft foils interposed between alternate edge portions of the successive micas in the stack, folding said foils over the edges to overlie one another and to extend across respective end portions of the stack, mechanically pressing the stack intensely to establish respective cold-welds between the foils and the film electrodes and thereby to unite the electrode-bearing micas to each other mechanically and to unite the respective overlying foils, and thereafter impregnating the united stack with a dielectric material.

6. The method of making mica condensers, including the steps of providing micas with metal-film electrodes at the opposite faces thereof, stacking such electrode-bearing micas with relatively soft foils interposed between alternate electrode-bearing edge portions of successive micas in the stack, cold-welding the foils to the respective confronting electrodes of the stacked micas and thereby uniting the film-bearing micas to each other mechanically and providing electrical connections to the respective electrodes, and thereafter impregnating the united stack of electrode-bearing micas with a dielectric.

7. The method of making mica condensers, including the steps of stacking a number of micas each having metal-film electrodes bonded to the opposite faces thereof with soft relatively low-melting metal foils having portions interposed between confronting electrodes of alternate edge portions of the micas in the stack and having marginally projecting portions and with a pair of relatively hard and solderable terminal metal foils in the form of channels at the opposite edges, one of said solderable foils embracing all of the micas and the other embracing all but one of the micas, cold-welding said soft metal foils to confronting electrodes in the stack and, alternately, to said terminal foils, and soldering wire terminals to said terminal foils.

8. The method of making mica condensers, including the steps of stacking a number of micas each having bonded conductive metal-film electrode portions on the opposite faces thereof, the stack incorporating marginally exposed conductive terminal portions extending from successive confronting micas in the stack alternately at one edge and at the opposite edge of the stack, applying heavy pressure to said stack so as to cold-weld the conductive portions between confronting micas and thereby uniting said micas mechanically and forming electrical connections from said metal-film electrodes, impregnating the thus united stack with a dielectric polymer, polymerizing the impregnant, and forming respective terminal connections to said conductive terminal portions.

9. The method of making mica condensers, including the steps of stacking a number of micas each having metal-film electrodes bonded to the opposite faces thereof with soft relatively low-melting metal foils having portions interposed between confronting electrodes of alternate edge portions of the micas in the stack and having marginally projecting portions, assembling a pair of relatively hard and solderable terminal metal foils to said marginally projecting portions and forming all said foils into channels at the opposite edges of the stack, cold-welding said soft metal foils to each other and to confronting electrodes in the stack, and, alternately, to said terminal foils, and soldering wire terminals to said terminal foils.

References Cited in the file of this patent

UNITED STATES PATENTS

| | | |
|---|---|---|
| 1,334,142 | Dubilier | Mar. 16, 1920 |
| 1,497,095 | Dubilier | June 10, 1924 |
| 2,522,713 | Gray | Sept. 19, 1950 |
| 2,531,389 | Brandt | Nov. 28, 1950 |
| 2,627,645 | Harriss | Feb. 10, 1953 |